United States Patent [19]

Shiokawa et al.

[11] Patent Number: 5,063,396

[45] Date of Patent: Nov. 5, 1991

[54] DROPLETS JETTING DEVICE

[75] Inventors: Shoko Shiokawa; Yoshikazu Matsui; Toshihiko Ueda, all of Shizuoka, Japan

[73] Assignee: Seiko Epson Corporation, Tokyo, Japan

[21] Appl. No.: 492,446

[22] Filed: Mar. 13, 1990

[30] Foreign Application Priority Data

Mar. 14, 1989 [JP] Japan .................................... 1-61289

[51] Int. Cl.[5] .......................... B41J 2/04; G01D 15/16

[52] U.S. Cl. ................................................. 346/140 R

[58] Field of Search ...................... 346/140 R; 310/334

[56] References Cited

U.S. PATENT DOCUMENTS 4,697,195 9/1987 Quate et al. ...................... 346/140 R 4,748,461 5/1988 Elrod .............................. 346/140 R

*Primary Examiner*—Benjamin R. Fuller

*Assistant Examiner*—Alrick Bobb

*Attorney, Agent, or Firm*—Cushman, Darby & Cushman

[57] ABSTRACT

A device for splashing liquid in the form of droplets from a piezo electric material with cuts on the surface thereof. Electrodes are formed on the surface to apply an AC voltage thereto. The voltage input is pulsed. The pulsed voltage causes a Rayleigh mode wave to propagate along the surface. Liquid also propagates along the surface, and the wave causes some of the liquid to splash off the surface as droplets.

6 Claims, 2 Drawing Sheets

DROPLETS JETTING DEVICE

BACKGROUND OF THE INVENTION

This invention relates to a droplets jetting device in which a progressive wave of a Rayleigh mode elastic surface wave is utilized to splash a liquid in the form of droplets from the propagation surface thereof.

In a conventional droplet jetting device, the bulk wave of a piezo-electric element is used to apply alternate pressure to the liquid in a closed container thereby to jet liquid in the form of droplets through a small nozzle connected to the container.

One example of the conventional droplets jetting device will be described with reference to FIG. 5. In FIG. 5, reference numeral 11 designates a liquid to be jetted in the form of droplets; 12, a container in which the liquid is put, namely, a pressure chamber; 13, a cylindrical piezo-electric element for applying pressure to the liquid; 14, a nozzle for jetting the liquid in the form of droplets; 15, a fluid resistance element for limiting the flow of the liquid; 16, a valve for allowing the liquid to flow only towards the nozzle; and 17, a liquid supplying path.

A voltage is applied across the electrodes formed on the inner and outer walls of the cylindrical piezo-electric element 13 so that the latter 13 is contracted radially. As a result, the liquid 11 in the pressure chamber 12 is pressurized, so that it is passed through the fluid resistance element 15 and jetted from the nozzle 14. As the quantity of liquid in the pressure chamber decreases in this manner, the liquid is supplied thereinto through the liquid supply path 17. As is apparent from the above description, the liquid is jetted in the form of droplets from the nozzle 14 successively by applying an AC voltage to the piezo-electric element 13.

The conventional device employs the nozzle to form droplets as required. In order to reduce the size of droplets, it is necessary to decrease the diameter of the nozzle. To manufacture such a small diameter nozzle is rather difficult. In the case where the liquid is ink, the device suffers from the following difficulties: When the ink dries, the nozzle becomes clogged; therefore, the maintenance of the device is troublesome, and reliability of the device decreases. Those difficulties may be eliminated by adding an ink drying preventing mechanism or a nozzle cleaning mechanism to the device. However, the addition of such a mechanism may result in other difficulties such that the device becomes more intricate in construction, larger in size, and higher in manufacturing cost.

SUMMARY OF THE INVENTION

Accordingly, an object of this invention is to eliminate the above-described difficulties accompanying a conventional droplets jetting device.

The foregoing object and other objects of the invention have been achieved by a droplets jetting device which, according to the invention, comprises: a piezo-electric substrate made of a piezo-electric material forming a Rayleigh mode elastic surface wave, the piezo-electric substrate having cut surfaces; a pair of input electrodes provided on the surface of the piezo-electric substrate to apply AC voltage to the piezo-electric substrate to form a Rayleigh mode elastic surface wave; and means for placing a liquid to be splashed in the form of droplets on the path of propagation of the Rayleigh mode elastic surface wave thus formed.

The nature, principle and utility of the invention will become more apparent from the following detailed description when read in conjunction with the accompanying drawings, in which like parts are designated by like reference numerals.

DETAILED DESCRIPTION OF THE PREFERRED EMBODIMENTS

Figure 1:
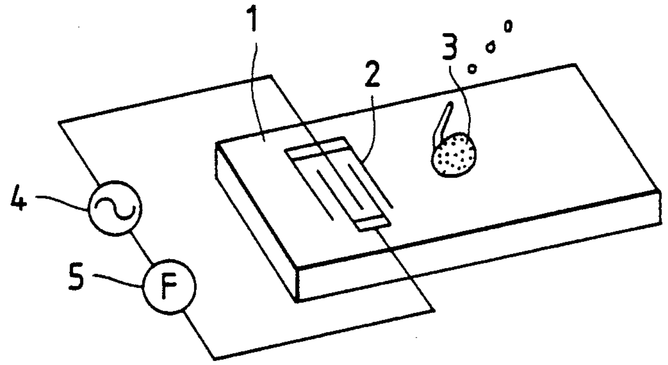
FIG. 1 is an explanatory diagram for a description of the operating principle of a droplets jetting device according to the invention which utilizes a Rayleigh mode elastic surface wave.

The principle and construction of a droplet jetting device according to this invention will be described with reference to FIG. 1.

The droplet jetting device according to the invention utilizes a Rayleigh mode elastic surface wave, and has no nozzle. A pair of input electrodes 2 are provided on a substrate 1 which is made of piezo-electric material and has cut surfaces to produce a Rayleigh mode elastic surface wave. An AC electrical signal is applied to the input electrodes 2 to excite a Rayleigh mode elastic surface wave. A liquid 3 to be splashed in the form of droplets is placed on the path of propagation of the Rayleigh mode elastic surface wave of the substrate 1.

More specifically, the pair of input electrodes 2 are formed on the same surface of the substrate 1; for instance, they are comb-shaped electrodes intertwined with each other. An AC electrical signal generator 4 produces an AC voltage which is applied to the input electrodes 2. A pulse signal generator 5 is provided to cause the AC electrical signal to occur intermittently.

When the electrical signal, which is outputted by the AC electrical signal generator 4 with the aid of the pulse signal generator, is applied through the input electrodes 2 to the substrate 1, the latter outputs an elastic surface wave. The elastic surface wave thus outputted propagates along the surface of the substrate 1. The Rayleigh wave shows progressive wave characteristics and acts as follows when the liquid 3 is placed on the surface of propagation. The wave radiates longitudinally in the liquid 3 while propagating along the interface of the substrate 1 and the liquid 3, thus splashing part of the liquid in the form of droplets. In this case, the diameter of the droplets thus splashed and the number of droplets formed per unit of time depend on such properties as the surface tension and viscosity of the liquid 3 the quantity of the liquid 3, the type of material used in the cut direction, the surface conditions (for instance, smoothness, whether the surface is hydrophilic or hydrophobic), and the frequency of the AC electrical signal, and especially on the frequency and voltage of the AC electrical signal, and the frequency and duty ratio of the pulse signal generator 5. The direction of the splash of the droplets coincides substantially with the direction of the composite vector of the Rayleigh wave radiation energy and the vector of the liquid surface tension. The radiation energy depends on the voltage applied to the input electrodes 2, and the direction of the radiation energy is determined from the ratio of the acoustic velocity of the substrate 1 in the direction of propagation and the acoustic velocity of the liquid 3.

As was described above, the diameter of the droplets thus splashed, the number of droplets formed per unit of time, and the direction of flight of the droplets, depending on the quantity and properties of the liquid, can be stabilized by suitably selecting the voltage applied through the input electrodes 2 to the substrate, its frequency, and the frequency and duty ratio of the pulse signal generator 5.

The direction and position of flight of the droplets can be controlled by providing a reflecting board on the surface of propagation of the Rayleigh mode elastic surface wave of the substrate 1. This will be described with reference to FIG. 2.

Figure 2:
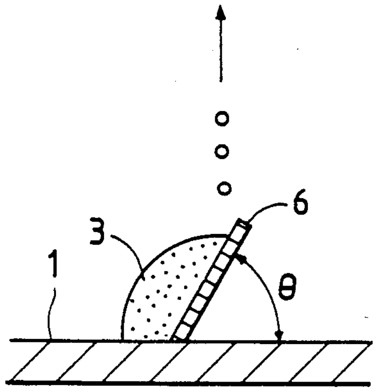
FIG. 2 is a sectional view for a description of the effect of a reflecting board added to the device shown in FIG. 1.

In FIG. 2, reference numeral 1 designates a piezoelectric substrate; 6, a reflecting board for reflecting the radiation wave which is applied to a liquid by the Rayleigh mode elastic surface wave; and 3, the liquid to be jetted in the form of droplets.

The direction of flight of the droplets coincides substantially with the direction of the vector of the radiation energy of the Rayleigh mode elastic surface wave and the vector of the surface tension of the droplet, as was described before. However, the direction of the radiation energy can be changed by reflecting the radiation energy applied to the liquid with the reflecting board 6; more specifically, it can be changed by adjusting the angle $\theta$ formed by the reflecting board 6 and the substrate 1. That is, the direction of flight of the droplets can be readily changed by providing the reflecting board on the surface of propagation of the Rayleigh elastic surface wave of the substrate 1.

Figure 3:
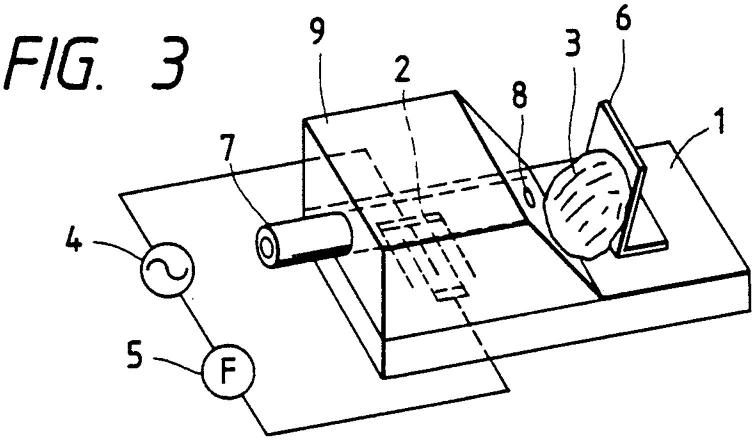
FIGS. 3 and 4 are perspective views showing first and second examples of the droplets jetting device according to the invention.

FIG. 3 shows one example of the droplet jetting device according to the invention which utilizes the Rayleigh mode elastic surface wave.

In FIG. 3, reference numeral 1 designates a piezoelectric substrate; 2, comb-shaped input electrodes to which an AC voltage is applied; 3, a liquid to be splashed in the form of droplets; 4, an AC electrical signal generator; 5, a pulse signal generator; 6, a reflecting board; 7, a liquid supplying pipe; 8, a liquid supplying inlet; and 9, a comb-shaped electrode protective cover.

The AC electrical signal generator 4, and the pulse signal generator causing an AC electrical signal to occur intermittently operate in combination to produce an electrical signal. The electrical signal thus produced is applied to the comb-shaped input electrodes 2 to form an elastic surface wave on the piezo- electric substrate 1. The Rayleigh wave having progressive wave characteristics radiates longitudinal waves in the liquid 3 on the surface of propagation thereof. This radiation energy is reflected by the reflecting board 6 to splash the liquid in the form of droplets. In this case, the droplets can be splashed in a desired direction by adjusting the angle of the reflecting board with respect to the piezoelectric substrate 1. The liquid is supplied from a liquid source (not shown) through the liquid supplying pipe 7 and the liquid supplying inlet 8 so that the liquid 3 to be splashed is maintained substantially constant in quantity. The comb-shaped electrode protective cover 9 is used to prevent the comb-shaped input electrodes 2 from being wetted by the liquid and from being damaged. The protective cover 9 is so installed as not to lower the efficiency of excitation of the Rayleigh mode elastic surface wave; that is, it is so installed that it is not in contact with the comb-shaped electrodes and the path of propagation of the surface wave except the part where it is brought into contact with the liquid.

Figure 4:
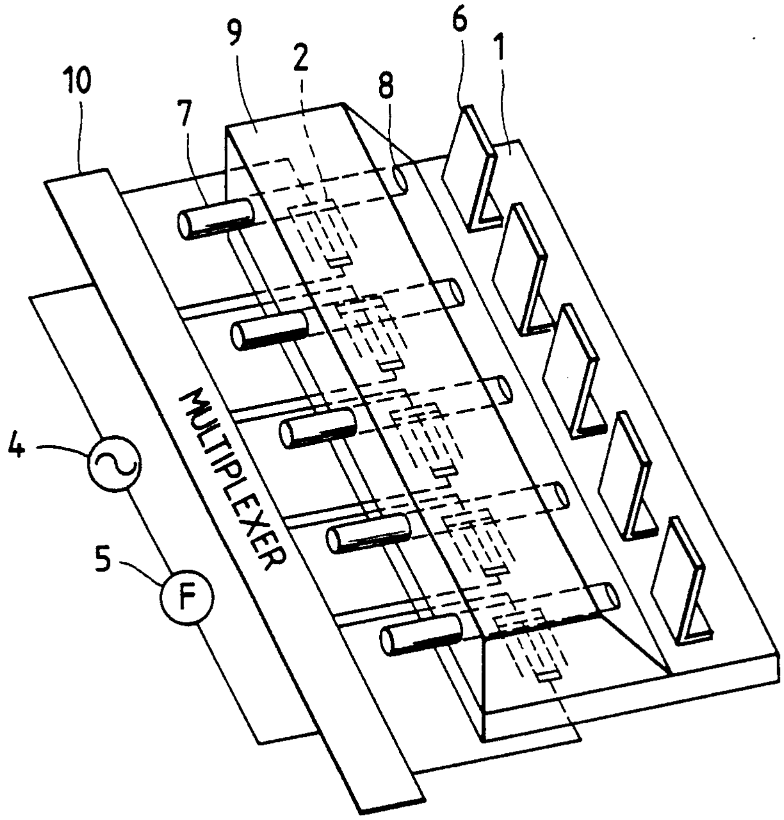
Figure 5:
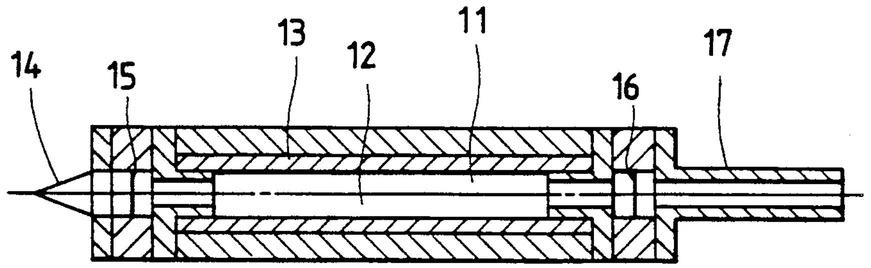
FIG. 5 (PRIOR ART)
FIG. 5 is a sectional view showing a conventional droplets jetting device.

A second example of the droplets jetting device according to the invention is as shown in FIG. 4. In FIG. 4, parts corresponding functionally to those which have been described with reference to FIG. 3 are therefore designated by the same reference numerals. Further in FIG. 4, reference numeral 10 designates a multiplexer. As is apparent from comparison between FIGS. 3 and 4, the second example of the droplets jetting device can be obtained by juxtaposing a plurality of the first examples shown in FIG. 3 (hereinafter referred to as "unitary droplets jetting devices"). The AC electrical signal is applied through the multiplexer 10 to the comb-shaped input electrodes 2 of the plurality of unitary droplets jetting devices. The multiplexer 10 operates to apply the AC electrical signal to the comb-shaped input electrodes 2 selectively according to the use of the device.

Thus, the fluids 3 on the paths of propagation of the Rayleigh mode elastic surface waves are splashed in response to the AC electrical signals which are applied to the comb-shaped input electrodes 2 selectively by the multiplexer 10.

As is apparent from the above-described embodiments, the droplets jetting device has a wide range of applications. That is, by arranging the devices shown in FIGS. 1 and 2 in various manners, a variety of droplets jetting devices can be formed.

As was described above, the droplets jetting device of the invention utilizes the progressive wave of the Rayleigh mode elastic surface wave. Therefore, the device is simple in construction, and has no nozzle; that is, it is free from the difficulty that the nozzle is clogged up with a liquid such as ink.

While there has been described in connection with the preferred embodiments of the invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A droplets jetting device, comprising:
   - a substrate having a piezo-electric material for generating a Rayleigh mode elastic surface wave in response to an AC voltage applied thereon, said substrate including a surface for propagation of said wave thereupon;
   - a pair of input electrodes formed on the surface of said substrate, for applying an AC voltage to said substrate;
   - AC voltage generator means for generating an AC voltage and applying said AC voltage to said input electrodes;
   - pulse signal generator means for causing said AC voltage to occur intermittently;
   - means for placing liquid droplets on the surface of said substrate, said droplets being placed downstream of and propagating in the same direction as the Rayleigh surface wave.

2. A droplets jetting device as in claim 1, further comprising control means provided on said substrate for controlling a direction and position of flight of the droplets.

3. A droplets jetting device as in claim 2, in which said control means comprises a reflecting board extending from said substrate at an angle, and means for adjusting the angle with respect to the substrate, for splashing the droplets in a predetermined direction.

4. A droplets jetting device as in claim 1, further comprising a protective cover for covering said input electrodes.

5. A droplets jetting device as in claim 1, further comprising a multiplexer for applying an AC electrical signal to said input electrodes.

6. A droplets jetting device as in claim 1, in which said input electrodes comprises a pair of comb-shaped electrodes intertwined with each other.

* * * * *